(12) United States Patent
Letourneau

(10) Patent No.: US 11,933,346 B1
(45) Date of Patent: Mar. 19, 2024

(54) REMOVABLE SHOULDER SCREW

(71) Applicant: NOKIA SOLUTIONS AND NETWORKS OY, Espoo (FI)

(72) Inventor: Fabien Letourneau, Gatineau (CA)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/316,776

(22) Filed: May 12, 2023

(51) Int. Cl.
*F16B 5/02* (2006.01)
*F04D 19/00* (2006.01)
*F04D 29/64* (2006.01)

(52) U.S. Cl.
CPC .......... *F16B 5/0266* (2013.01); *F04D 19/002* (2013.01); *F04D 29/644* (2013.01); *F16B 5/02* (2013.01); *F16B 5/0275* (2013.01)

(58) Field of Classification Search
CPC ........ F16B 5/0266; F16B 5/02; F16B 5/0275; F04D 19/002; F04D 29/644
See application file for complete search history.

(56) References Cited

U.S. PATENT DOCUMENTS

| | | | | |
|---|---|---|---|---|
| 4,877,364 A | * | 10/1989 | Sorrentino | F16B 41/002 |
| | | | | 403/408.1 |
| 4,959,938 A | * | 10/1990 | De Caro | F16B 31/02 |
| | | | | 411/413 |
| 5,609,454 A | * | 3/1997 | Lee | F16B 5/0275 |
| | | | | 411/410 |
| 5,746,039 A | * | 5/1998 | Nystrom | E04C 3/04 |
| | | | | 52/696 |
| 6,053,653 A | * | 4/2000 | Tanaka | F16B 5/0275 |
| | | | | 411/413 |
| 6,464,578 B1 | * | 10/2002 | Chin | H05K 7/20172 |
| | | | | 361/695 |
| 6,893,213 B1 | | 5/2005 | Quill | |

(Continued)

FOREIGN PATENT DOCUMENTS

| | | | | |
|---|---|---|---|---|
| CA | 2839176 A1 | * | 5/2013 | .......... F03B 13/1845 |
| DE | 2143784 A1 | * | 3/1973 | |

(Continued)

OTHER PUBLICATIONS

Shao-Yi Hsia et al., "Cold Forging Analysis and Verification of Multi-Stage Hexagonal Flange Screw," IEEE Conference Publication, Dec. 27, 2019, https://ieeexplore.ieee.org/document/8942720.

*Primary Examiner* — Brian Christopher Delrue
(74) *Attorney, Agent, or Firm* — Kramer & Amado, P.C.

(57) ABSTRACT

A screw assembly, including: a removable shoulder screw including: a first screw shaft portion; a second screw shaft portion; a first threaded portion; and a first shaft edge between the first screw shaft portion and the second screw shaft portion, wherein the second screw shaft portion is between the first screw shaft portion and the first threaded portion, and wherein a diameter of the second screw shaft portion is smaller than the diameter of the first screw shaft portion; and a first removable shoulder including a first removable shoulder opening and a first removable shoulder edge, wherein the first removable shoulder opening has a diameter less than the diameter of the first screw shaft portion and is configured to engage the second screw shaft portion, and wherein the first removable shoulder edge is configured to engage the first shaft edge.

7 Claims, 9 Drawing Sheets

(56) References Cited

U.S. PATENT DOCUMENTS

| | | | | | |
|---|---|---|---|---|---|
| 7,150,596 | B2* | 12/2006 | Diaz | ............... | F16B 5/02 411/21 |
| 8,475,103 | B2* | 7/2013 | Michalski | ............... | F16B 43/001 411/371.1 |
| 8,631,629 | B1* | 1/2014 | Wiener | ............... | E04D 13/1476 52/173.3 |
| 9,011,094 | B2 | 4/2015 | McPeek | | |
| 2005/0129484 | A1* | 6/2005 | Huang | ............... | F16B 25/00 411/389 |
| 2006/0182511 | A1* | 8/2006 | Dessureau | ............... | F16B 5/0275 411/38 |
| 2007/0252451 | A1* | 11/2007 | Shibuya | ............... | H02K 7/14 310/67 R |
| 2008/0042497 | A1* | 2/2008 | Parker | ............... | H02K 7/06 310/24 |
| 2009/0104001 | A1* | 4/2009 | Kochheiser | ............... | F16B 25/10 411/383 |
| 2009/0136294 | A1 | 5/2009 | Porter | | |
| 2009/0269162 | A1* | 10/2009 | Heinrich | ............... | F16B 5/0275 411/371.1 |
| 2013/0045062 | A1* | 2/2013 | Tao | ............... | F16B 5/0266 411/347 |
| 2013/0251559 | A1* | 9/2013 | Taroda | ............... | F04D 29/544 417/410.1 |
| 2015/0050133 | A1* | 2/2015 | Jiang | ............... | F04D 29/664 415/183 |
| 2015/0078860 | A1* | 3/2015 | Ellingson | ............... | F16B 35/06 411/368 |
| 2015/0308455 | A1* | 10/2015 | Heli | ............... | F04D 29/584 415/177 |
| 2018/0274573 | A1* | 9/2018 | Frost | ............... | F16B 5/0208 |
| 2019/0128311 | A1* | 5/2019 | Cheung | ............... | F16B 43/009 |
| 2019/0301472 | A1* | 10/2019 | Kato | ............... | F04D 19/024 |
| 2020/0177035 | A1* | 6/2020 | Fukushima | ............... | H02K 1/187 |

FOREIGN PATENT DOCUMENTS

| | | |
|---|---|---|
| WO | 2021/222862 A1 | 11/2021 |
| WO | 2022/214842 A1 | 10/2022 |

* cited by examiner

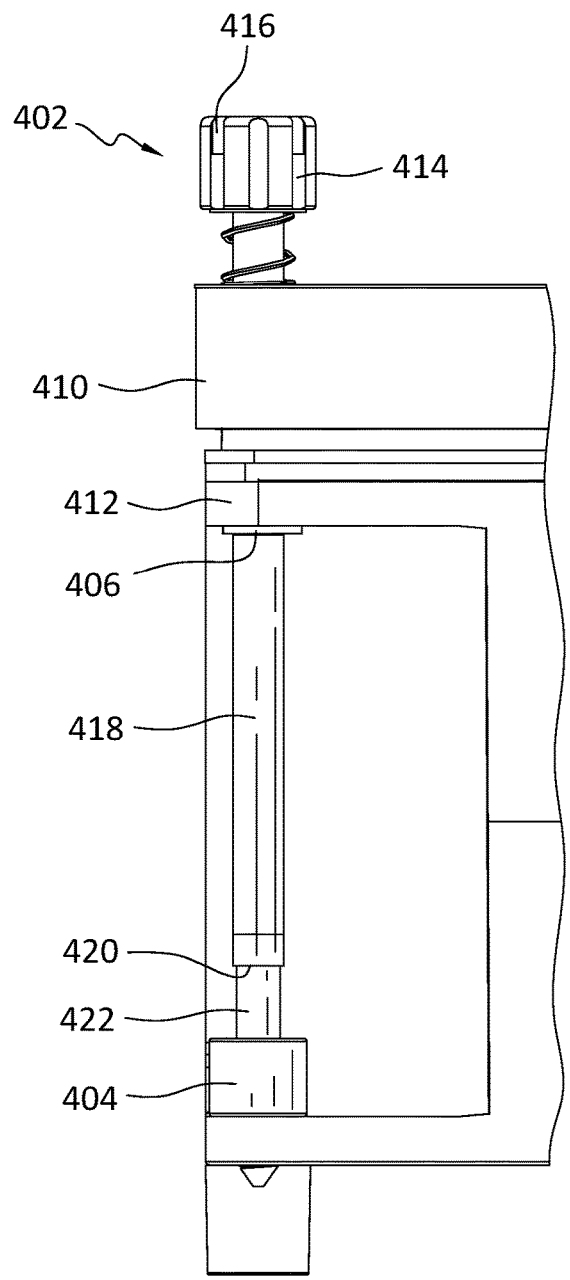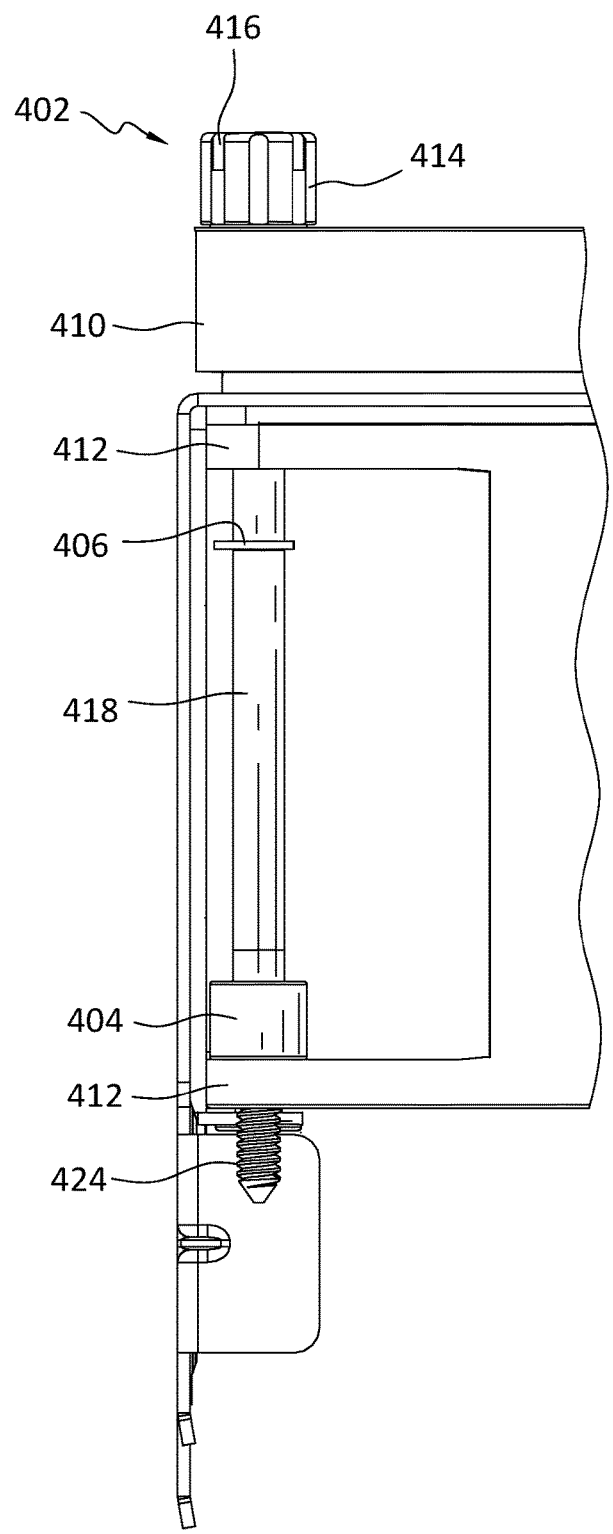
FIG. 4C
FIG. 4D

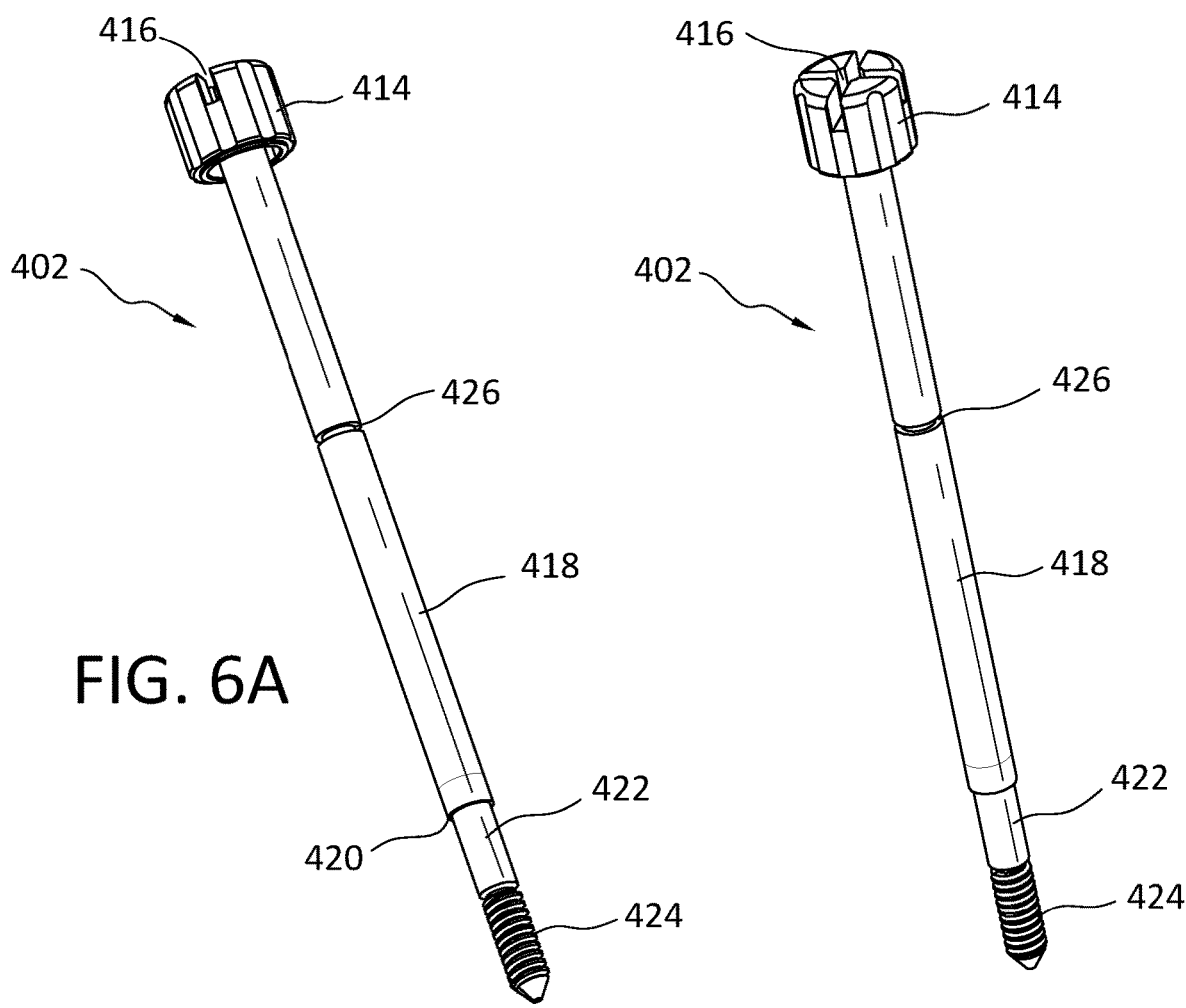
FIG. 6A
FIG. 6B
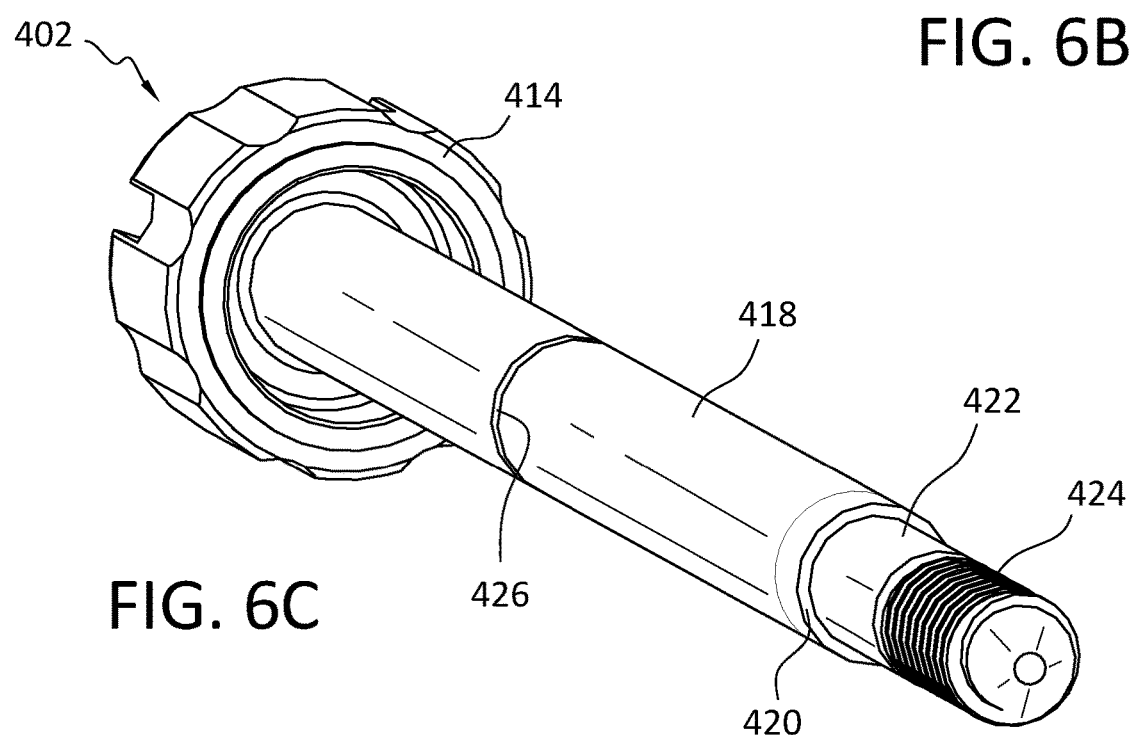
FIG. 6C

REMOVABLE SHOULDER SCREW

FIELD OF THE DISCLOSURE

Various exemplary embodiments disclosed herein relate to removable shoulder screws and removable shoulders.

BACKGROUND

Various mechanical systems are assembled using screws and bolts and nuts. One example of such a system is cooling fans mounted to a cooling fan fixture and cooling fan fixtures mounted to an enclosure or equipment. When mechanical systems are assembled, they should be assembled so that stresses and flexure due to the use of mounting hardware is reduced.

SUMMARY

A summary of various exemplary embodiments is presented below.

Various embodiments relate to a screw assembly, including: a removable shoulder screw including: a first screw shaft portion; a second screw shaft portion; a first threaded portion; and a first shaft edge between the first screw shaft portion and the second screw shaft portion, wherein the second screw shaft portion is between the first screw shaft portion and the first threaded portion, and wherein a diameter of the second screw shaft portion is smaller than the diameter of the first screw shaft portion; and a first removable shoulder including: a first removable shoulder opening and a first removable shoulder edge, wherein the first removable shoulder opening has a diameter less than the diameter of the first screw shaft portion and is configured to engage the second screw shaft portion, and wherein the first removable shoulder edge is configured to engage the first shaft edge.

Various embodiments are described, further including a screw head, wherein a diameter of the screw head is larger than the diameter of the first screw shaft portion.

Various embodiments are described, further including a spring configured to accept the first screw shaft portion therethrough and to engage the screw head.

Various embodiments are described, further including a clip, wherein the clip the clip is configured to engage a clip groove in the first screw shaft portion.

Various embodiments are described, further including a driver portion adjacent the first screw shaft portion, wherein a diameter of the driver portion is substantially the same as or less than the diameter of the first screw shaft portion.

Various embodiments are described, further including; a driver portion, wherein a diameter of the driver portion is substantially the same as or less than the diameter of the first screw shaft portion; and second threaded portion between the driver portion and the first screw shaft portion.

Various embodiments are described, further including; a driver portion, wherein a diameter of the driver portion is substantially the same as or less than the diameter of the first screw shaft portion; second threaded portion; third shaft portion; second shaft edge, wherein the second shaft edge is between the first screw shaft portion and the third shaft portion, wherein the second threaded portion is between the driver portion and the third shaft portion, and wherein the third shaft portion is between the second threaded portion and the second shaft edge; and a second removable shoulder including a second removable shoulder opening and a second removable shoulder edge, wherein the second removable shoulder opening has a diameter less than the diameter of the first screw shaft portion and is configured to engage the third shaft portion, and wherein the second removable shoulder edge is configured to engage the second shaft edge.

Various embodiments are described, further including a nut configured to engage the second threaded portion.

Various embodiments are described, further including: a first mechanical assembly; and a second mechanical assembly, wherein the removable shoulder screw is configured to pass through an opening in the first mechanical assembly and an opening in the second mechanical assembly, and wherein the first removable shoulder is configured to engage the first mechanical assembly to clamp a portion of the first mechanical assembly between the second mechanical assembly and the first removable shoulder.

Various embodiments are described, further including: a screw head, wherein a diameter of the screw head is larger than the diameter of the first screw shaft portion; and a spring configured to accept the first screw shaft portion therethrough and to engage the screw head and the second mechanical assembly.

Various embodiments are described, further including a clip, wherein the clip the clip is configured to engage a clip groove in the first screw shaft portion and to engage the first mechanical assembly.

Various embodiments are described, wherein the first mechanical assembly is a fan and the second mechanical assembly is a fan mounting assembly.

Further various embodiments relate to a fan assembly configured to engage a rack, including: a fan including a first hole in a first flange on a front side of the fan and a second hole in a second flange on a back side of the fan; a fan mounting assembly configured to engage the fan; a removable shoulder screw including: a first screw shaft portion; a second screw shaft portion; a threaded portion; and a shaft edge between the first screw shaft portion and the second screw shaft portion, wherein the second screw shaft portion is between the first screw shaft portion and the threaded portion, and wherein a diameter of the second screw shaft portion is smaller than the diameter of the first screw shaft portion; and a removable shoulder including a removable shoulder opening and a removable shoulder edge, wherein the removable shoulder opening has a diameter less than the diameter of the first screw shaft portion and is configured to engage the second screw shaft portion, wherein the removable shoulder edge is configured to engage the shaft edge, wherein the removable shoulder screw is configured extend through the first hole and the second hole, and wherein the removable shoulder is configured to engage the second flange.

Various embodiments are described, further including a screw head, wherein a diameter of the screw head is larger than the diameter of the first screw shaft portion.

Various embodiments are described, further including a spring configured to accept the first screw shaft portion therethrough and to engage the screw head and the fan mounting assembly.

Various embodiments are described, further including a clip, wherein the clip the clip is configured to engage a clip groove in the first screw shaft portion and engage the first flange.

Various embodiments are described, further including a driver portion adjacent the first screw shaft portion, wherein a diameter of the driver portion is substantially the same as or less than the diameter of the first screw shaft portion.

Various embodiments are described, wherein the threaded portion is configured to engage a threaded portion in the rack.

Various embodiments are described, wherein the removable shoulder applies a clamping force on the second flange a portion of the fan mounting assembly when the threaded portion engages the threaded portion of the rack.

Various embodiments are described, wherein a diameter of the threaded portion is less than or equal to the diameter of the second screw shaft portion.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4C illustrates a partial side view of the fan assembly with a removable shoulder screw not yet inserted.

FIG. 4D illustrates a partial side view of the fan assembly with a removable shoulder screw inserted.

FIGS. 6A, 6B, and 6C illustrate various perspective views of the removable shoulder screw.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of assembled mechanical systems using removable shoulder screws will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

Figure 1:
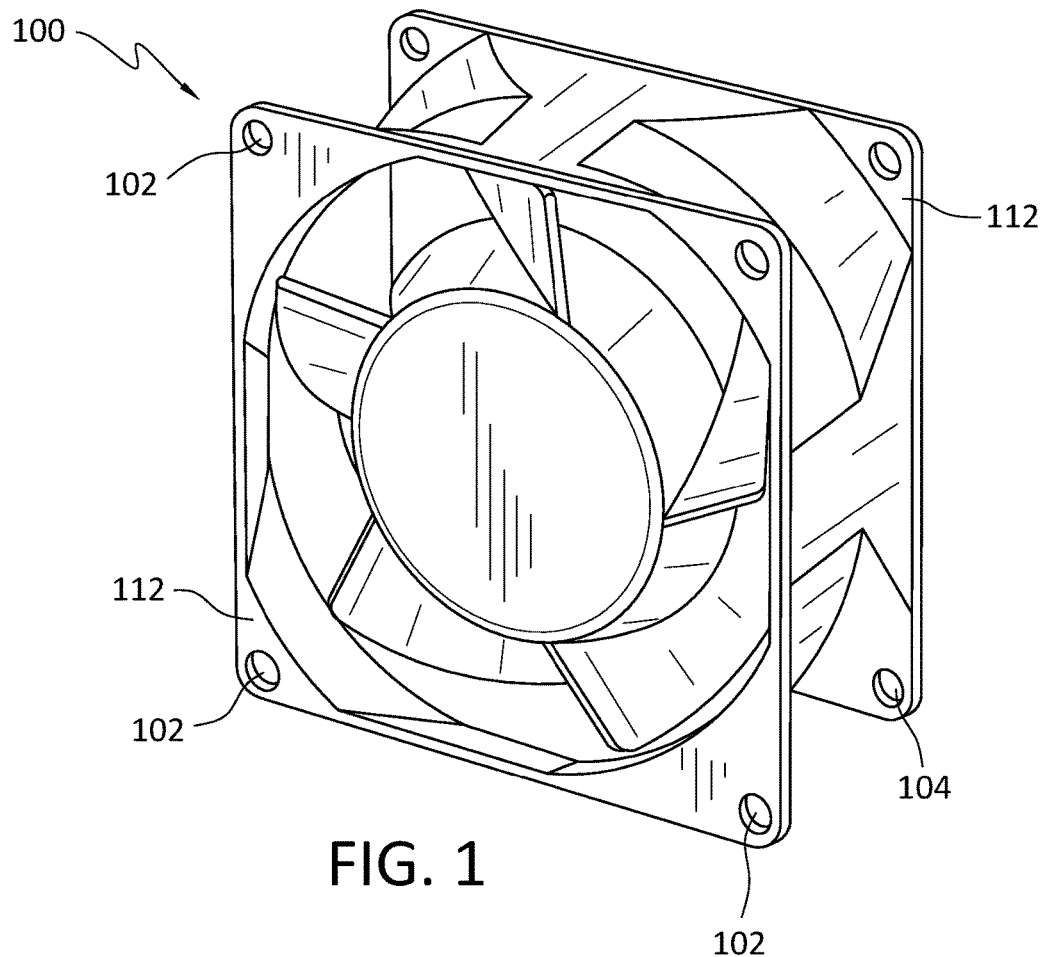
FIG. 1 illustrates an embodiment of an axial fan.
Figure 2A:
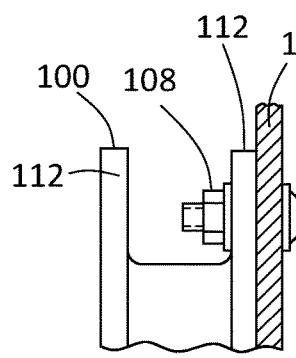
FIG. 2A illustrates the mounting of the fan assembly to fan mounting assembly using a bolt and a nut.

Axial fans are commonly used in the telecom industry to cool various electronics racks, subracks, enclosures or equipments, referred here after as equipment. These axial fans commonly have a plastic housing with flanges on the inlet side and on the outlet side of the fan. FIG. 1 illustrates an embodiment of an axial fan. The fan assembly 100 includes a housing with fan flanges 112. The fan flanges 112 also include front mounting holes 102 and back mounting holes 104. The housing and the fan flanges 112 may be made of plastic, metal, or some other material. As a result the fan flanges 112 may be flexible and may bend when the fan assembly 100 is attached to a fan mounting assembly 110. As a result, to ensure proper function and prevent deformation of the housing, manufacturers recommend using only one fan flange 112 when securing the fan assembly 100 to a fan mounting assembly 110. FIG. 2A illustrates the mounting of the fan assembly 100 to fan mounting assembly 110 using a bolt 106 and a nut 108. In FIG. 2A, the bolt 106 extends through only the front mounting holes 102 and the fan mounting assembly 110. The nut 108 is placed on the bolt 106 so that only the front flanges are used to mount the fan assembly 100 to the fan mounting assembly 110. Alternatively, the bolt 106 and the nut 108 may be used to connect the back flanges of the fan assembly 100 to the fan mounting assembly 110. This mounting approach does not cause any bending of the fan flanges 112.

Figure 2B:
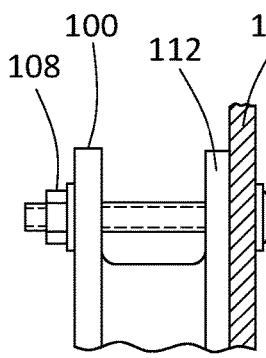
FIG. 2B illustrates the mounting of the fan assembly to the fan mounting assembly using the bolt and the nut using both the front and the back fan flanges.
Figure 2C:
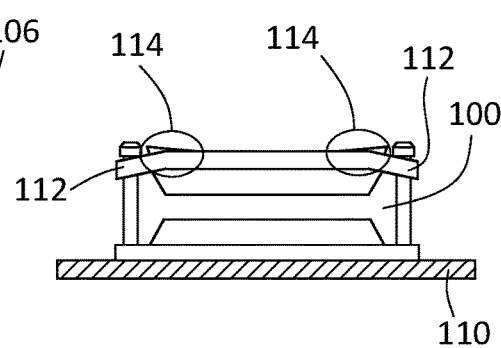
FIG. 2C illustrates bending that may occur to the fan flanges when this mounting approach is taken.

FIG. 2B illustrates the mounting of the fan assembly 100 to the fan mounting assembly 110 using the bolt 106 and the nut 108 using both the front and the back fan flanges 112. FIG. 2C illustrates bending that may occur to the fan flanges 112 when this mounting approach is taken. If the bolt 106 is tightened too much, this may cause bending of the fan flanges 112 as illustrated in the bent area 114. The bent area 114 may lead to cracking of the fan flanges 112 or may cause the fan blades of the fan assembly 100 to hit the fan inner housing during operation. As a result, this mounting approach may be avoided to prevent these problems. While the approach of FIG. 2A does not have this problem, it may be more difficult to assemble, and it may not provide as secure an attachment between the fan assembly 100 and the fan mounting assembly 110. And furthermore, it restricts the use of this location for further securing the fan assembly 100 and fan mounting assembly 110 together as a fan assembly (400) to the equipment.

Figure 3:
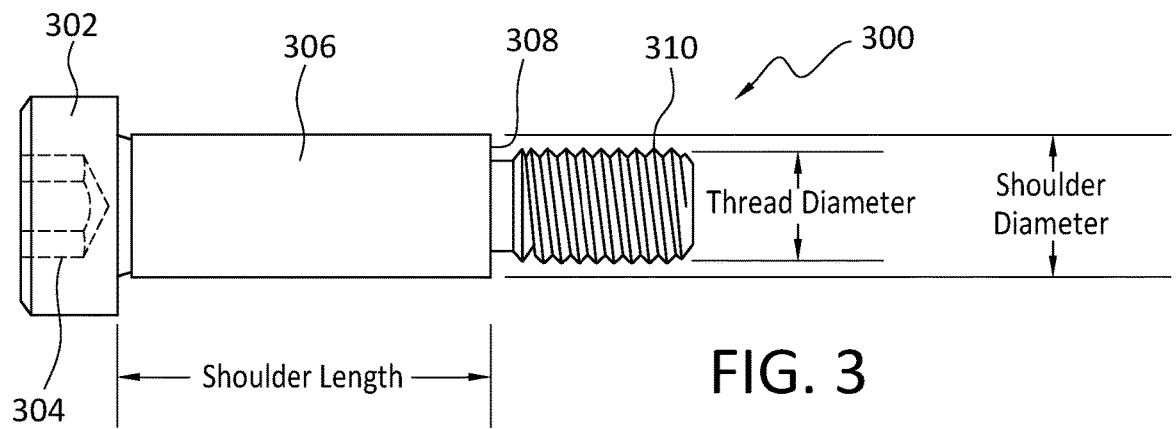
FIG. 3 illustrates an embodiment of a shoulder bolt.

One way to solve this problem is to use a shoulder bolt. FIG. 3 illustrates an embodiment of a shoulder bolt. The shoulder bolt 300 may include shoulder bolt head 302, driver opening 304, shoulder 306, shoulder edge 308, and thread 310. The shoulder bolt head 302 may include driver opening 304 which accepts a driver to drive the shoulder bolt 300. In this case, the driver opening 304 is illustrated as a hexagonal opening but may have other shapes including a slot or a Philips head compatible opening. The shoulder 306 extends from the shoulder bolt head 302 to the shoulder edge 308 and the thread 310. The thread 310 has a smaller diameter than the shoulder 306. As a result the thread 310 fits through a hole with a diameter smaller than the diameter of the shoulder 306. In this situation, the shoulder edge 308 engages the area around the hole. The shoulder 306 when properly sized prevents any excessive compression and/or bending of the fan flanges 112.

The use of a shoulder bolt 300 presents a few problems. The piece to be secured by a shoulder screw requires a larger hole than would normally be required for a standard screw of the same thread size. The larger hole is required to clear the shoulder part of the screw which has a larger diameter. The shoulder diameter is larger and will bottom out and take the reactive load induced by the torque of a fully seated screw. This would normally be done by the screw head for a regular screw. The hole that accepts the threaded portion of the shoulder bolt 300 would then have to be smaller than the diameter of the shoulder that means that the holes in the opposite sides of the fan would have different sizes. This would mean that a single version of the fan cannot be used for intake and exhaust applications as the holes on the two sides would be different.

On the flip side, if the shoulder is selected to fit an existing hole (such as in a fan housing), then the threaded end would need to be reduced in size so that the shoulder has a surface to engage. A smaller thread diameter makes for a weaker screw that is prone to failure.

The shoulder length is typically tightly toleranced for precision spacing. This allows for the screw to be fully torqued but not over-compress the part being assembled. For example, if used to assemble a fan, the shoulder length would be selected to be slightly longer than the fan assembly. Tolerances of the plastic housing of the fan can yield cases where the fan assembly is too loose or too tight depending on the tolerance of the fan assembly. The variation in size due to this looser tolerance is greater for the fan housing than for the screw shoulder.

Figure 4A:
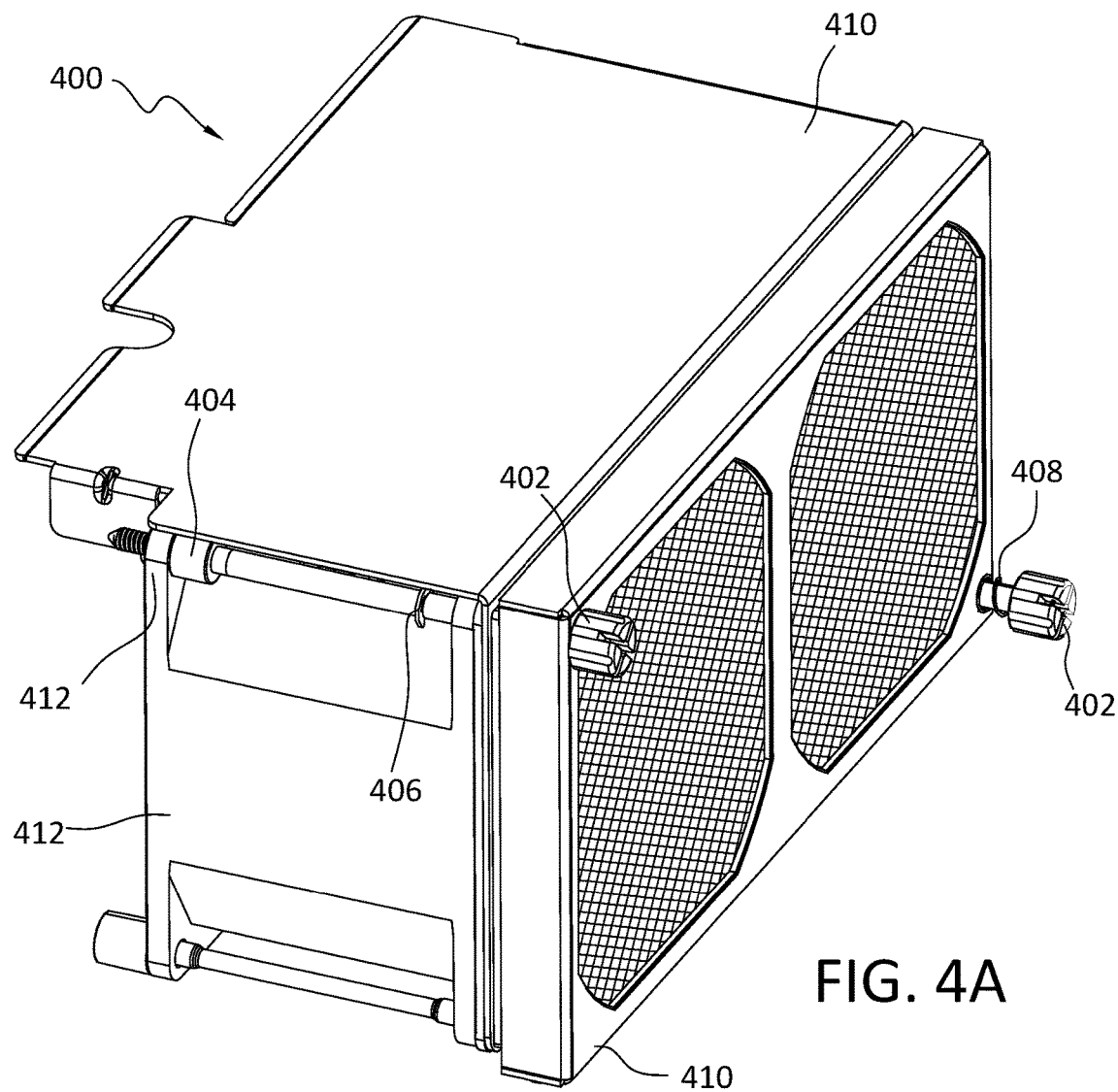
FIGS. 4A and 4B illustrate bottom and top perspective views of a fan assembly.
Figure 4B:
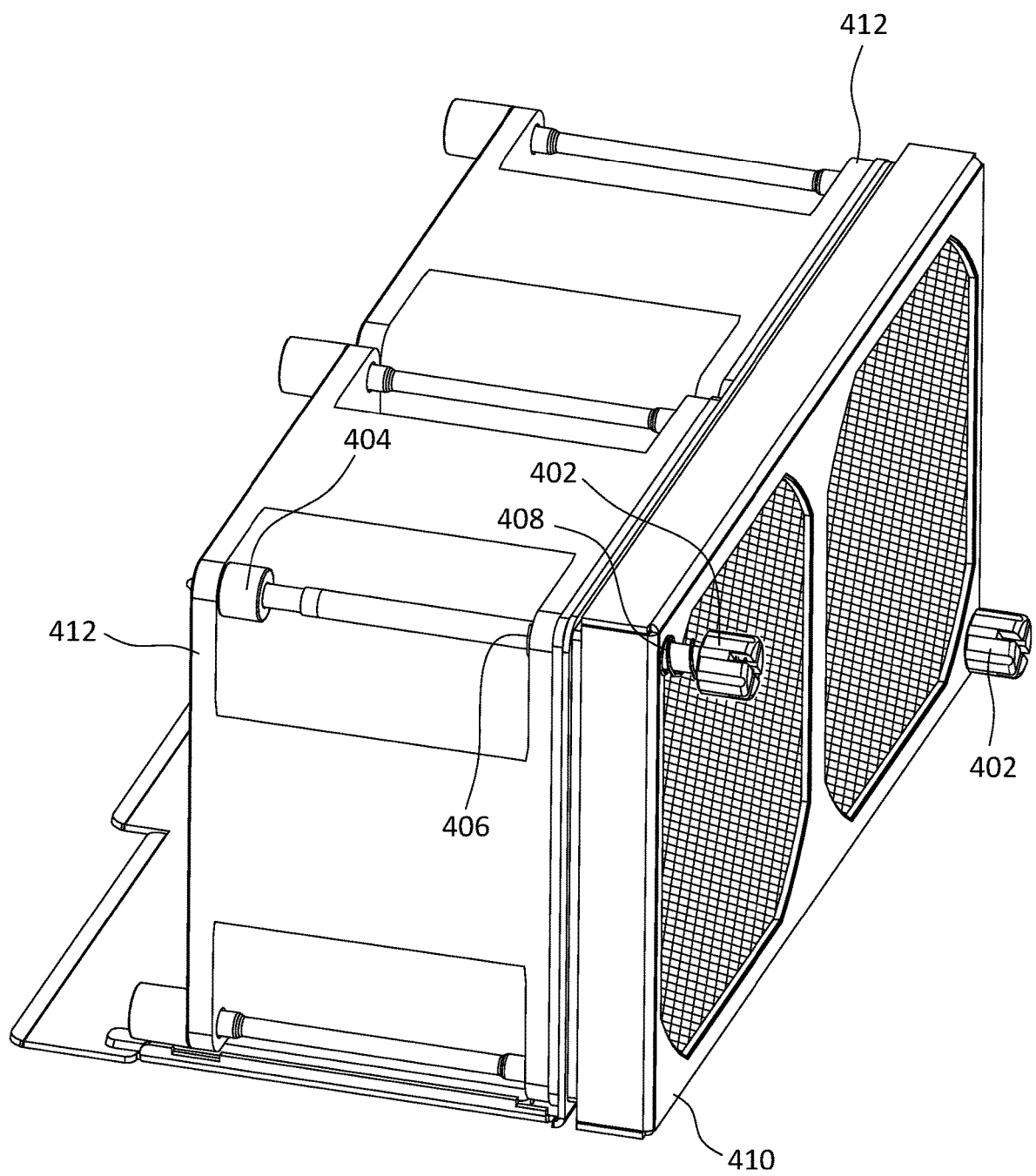

Embodiments of a removable shoulder screw will now be described. FIGS. 4A and 4B illustrate top and bottom perspective views of a fan assembly 400. FIG. 4C illustrates a partial side view of the fan assembly 400 with a removable shoulder screw not yet inserted. FIG. 4D illustrates a partial side view of the fan assembly 400 with a removable shoulder screw inserted. The fan assembly 400 includes a fan 412 and fan mounting assembly 410. The fan 412 is attached to the fan mounting assembly 410 using a regular shoulder screw (not shown in view FIGS. 4C and 4D but visible in FIG. 4B). The fan mounting assembly 410 is secured to the equipment using a removable shoulder screw 402 and a removable shoulder 404.

Figures 5A, 5B:
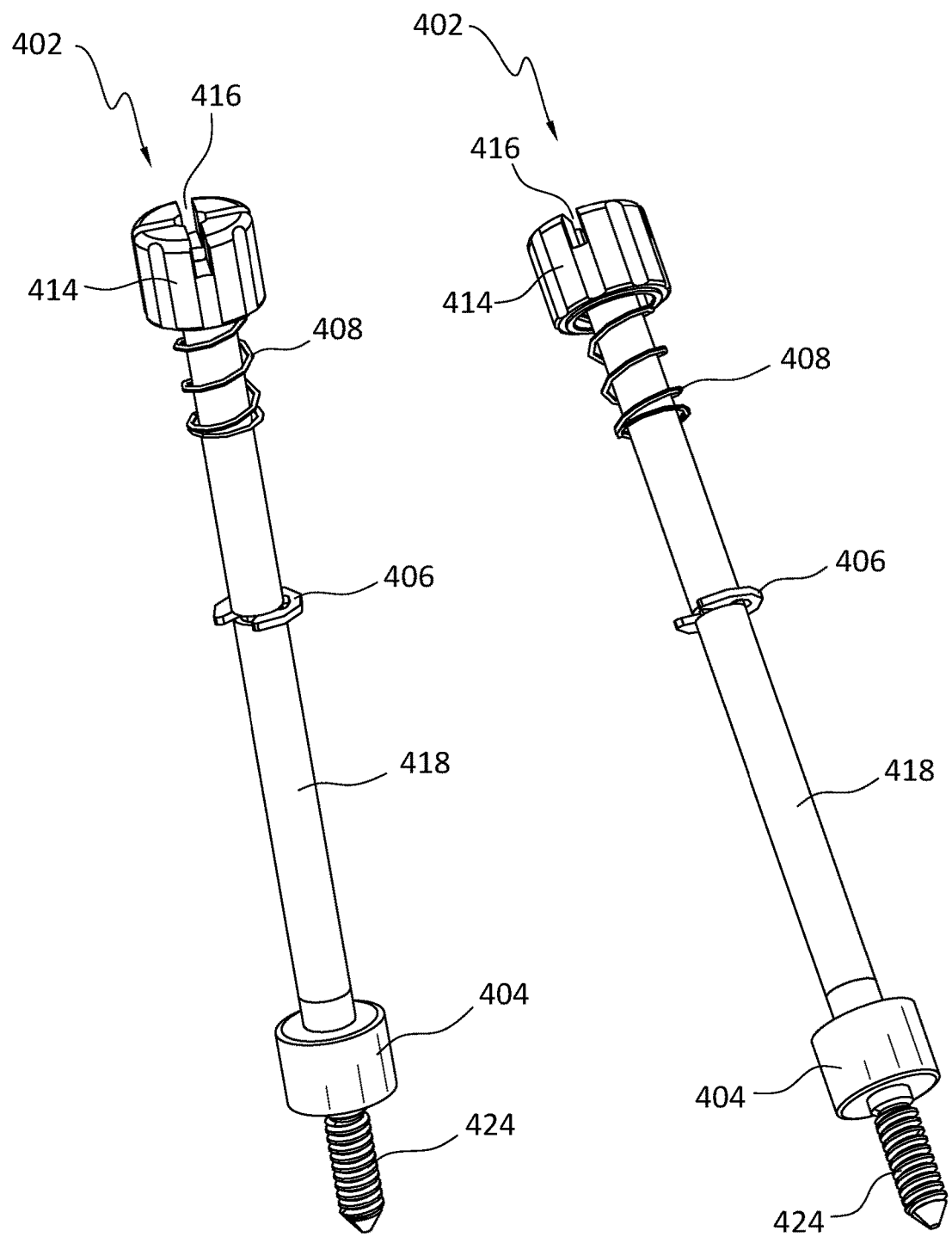
FIGS. 5A and 5B illustrate perspective views of removable shoulder screw and removable shoulder along with a C-clip and spring.

FIGS. 5A and 5B illustrate perspective views of removable shoulder screw 402 and removable shoulder 404 along with a C-clip 406 and spring 408. The spring 408 biases the removable shoulder screw 402 outward or away from the fan mounting assembly 410 when the removable shoulder screw 402 is not threaded into a mounting rack. The C-clip 406 provides a stop for the removable shoulder screw 402 and limits the distance that the spring 408 may bias the removable shoulder screw 402 upward (based upon the view in FIGS. 4C and 4D.)

FIGS. 6A, 6B, and 6C illustrate various perspective views of the removable shoulder screw 402. The removable shoulder screw 402 may include removable shoulder screw head 414, driver slot 416, first screw shaft portion 418, shaft edge 420, second screw shaft portion 422, removable shoulder screw thread 424, and clip groove 426. The removable shoulder screw head 414 includes driver slot 416 that may be used to drive and torque the removable shoulder screw 402. Driving structures other than the driver slot 416 may also be used including, for example, hexagonal, square, or Philips shaped openings. The clip groove 426 may accept the C-clip 406. The clip groove 426 is sized to allow the C-clip 406 to be securely engaged to the removable shoulder screw 402. Other types of clips may be used instead of the C-clip 406.

The removable shoulder screw 402 includes a first screw shaft portion 418. The first screw shaft portion 418 extends to a shaft edge 420. A second screw shaft portion 422 extends from the shaft edge 420 to the removable shoulder screw thread 424. The second screw shaft portion 422 has a diameter that is slightly smaller than the diameter of the first screw shaft portion 418. This difference in diameter forms shaft edge 420. The second screw shaft portion 422 is configured to receive the removable shoulder 404. The removable shoulder 404 may be slid over the end of the removable shoulder screw 402 over the removable shoulder screw thread 424 and onto the second screw shaft portion 422. The inner diameter of the removable shoulder 404 is selected to be substantially the same size as the diameter of the second screw shaft portion 422 but smaller than the diameter of the first screw shaft portion 418. As a result the shaft edge 420 acts as a stop for the removable shoulder 404 and limits the movement of the removable shoulder 404 along the removable shoulder screw 402. Further, as the removable shoulder screw 402 is tightened, the shaft edge 420 drives the second screw shaft portion 422 into contact with the fan 412 and the removable shoulder screw thread 424 engages a threaded portion of the equipment. This clamps the fan 412 and the fan mounting assembly 410 to the equipment without causing any bending of the flanges of the fan 412 when the removable shoulder screw 402 and removable shoulder 404 are properly sized.

Figure 7A:
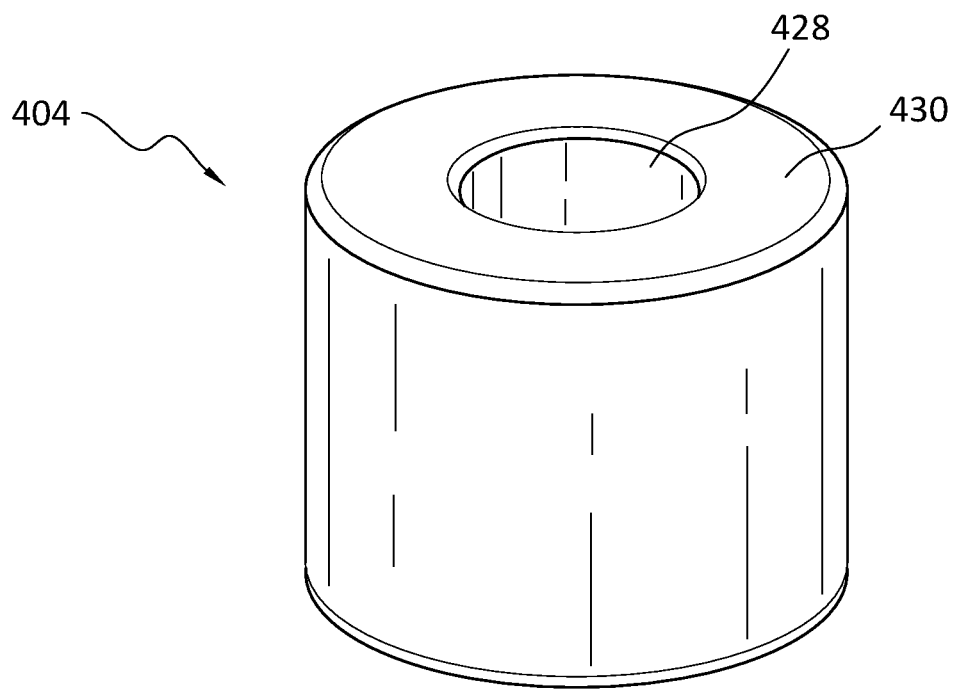
FIGS. 7A and 7B illustrate top perspective and top views of the removable shoulder.
Figure 7B:
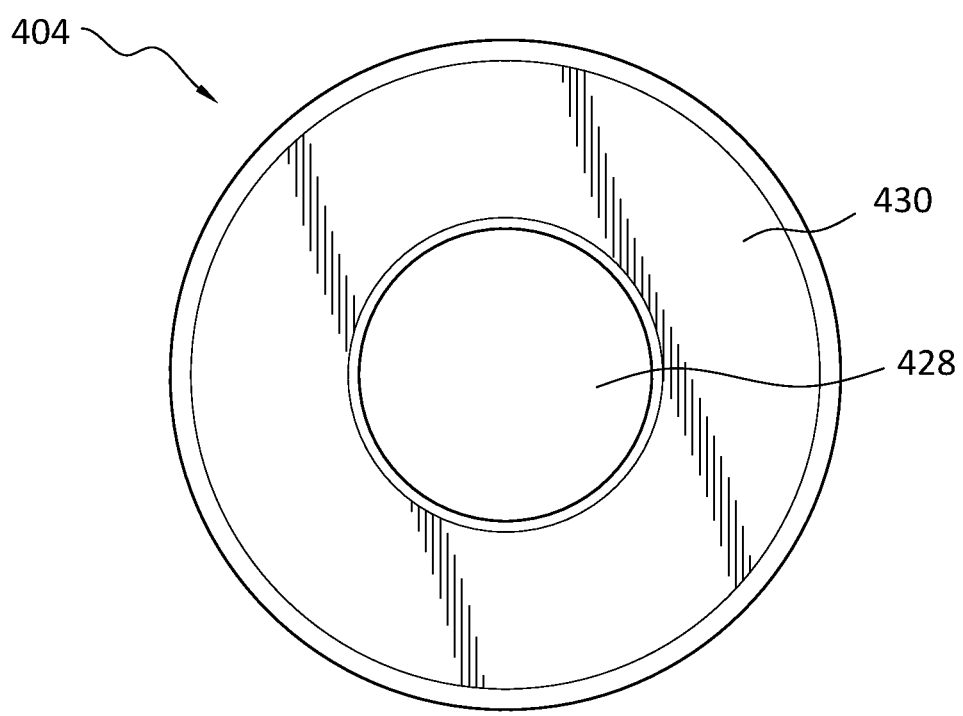

FIGS. 7A and 7B illustrate top perspective and top views of the removable shoulder 404. The removable shoulder 404 includes a removable shoulder opening 428 that extends through the removable shoulder 404 and that is configured to slide over the removable shoulder screw 402 and to engage the second screw shaft portion 422. The removable shoulder 404 also includes a removable shoulder edge 430 on each end of the removable shoulder 404. The removable shoulder edge 430 is configured to engage the shaft edge 420 when the removable shoulder screw 402 slides through the removable shoulder 404. This allows the shaft edge 420 to apply a clamping force on the removable shoulder 404 and hence on the fan 412 thus securing the fan 412 and fan mounting assembly 410. The diameter of the removable shoulder opening 428 is selected to be substantially the same as the diameter of the second screw shaft portion 422 (accounting for mechanical tolerances) and is smaller than the diameter of the first screw shaft portion 418. This allows the shaft edge 420 to engage the removable shoulder edge 430 of the removable shoulder 404.

FIG. 4C illustrates the fan 412 assembled with the fan mounting assembly 410 with the removable shoulder screw 402 not yet engaged. In this position, the spring 408 biases the removable shoulder screw 402 upward (according to FIG. 4C) until the C-clip 406 engages a lower surface of the fan 412. As a result the removable shoulder screw thread 424 does not extend through the flange of the fan 412 to engage a mounting support in the rack (not shown). Further, it is noted that the removable shoulder 404 is captured between the flange of the fan 412 and the shaft edge 420. FIG. 4D illustrates the fan 412 and the fan mounting assembly 410 assembled to the mounting support (not shown) in the equipment (not shown) with the removable shoulder screw 402 in an engaged position. As the removable shoulder screw 402 is tightened the removable shoulder screw thread 424 enters a mounting support of the equipment (not shown). The removable shoulder screw 402 advances until the shaft edge 420 comes into contact with the removable shoulder edge 430 of the removable shoulder 404 and the removable shoulder 404 is in contact with the flange of the fan 412. As a result the flanges of the fan 412 are not bent but the fan 412 and fan mounting assembly 410 are securely attached to the enclosure, and the clamping force is on the fan flanges and not transmitted through the body of the fan 412.

Figure 8A:
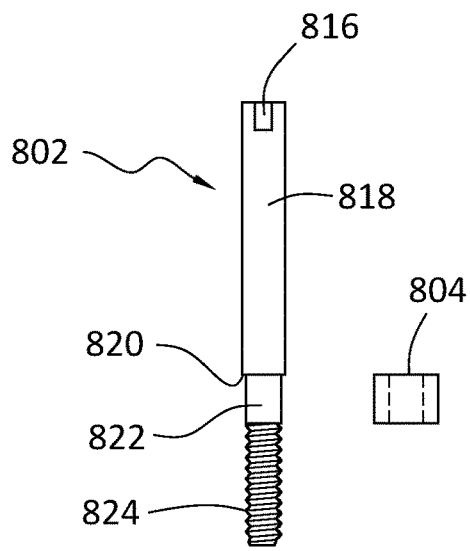
FIGS. 8A and 8B illustrate a headless removable shoulder screw and its associated removable shoulder.
Figure 8B:
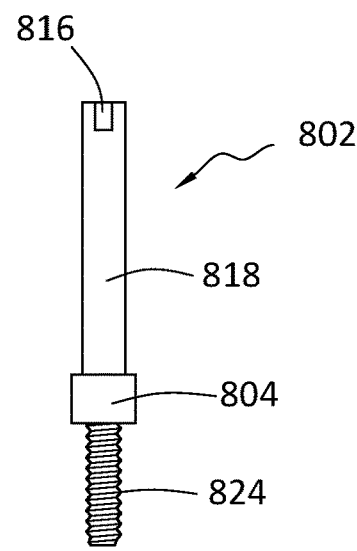

Because the clamping force is at the removable shoulder 404, it is possible to use an embodiment of the removable shoulder screw 802 that is headless. FIGS. 8A and 8B illustrate a headless removable shoulder screw 802 and its associated removable shoulder 804. The removable shoulder screw 802 does not have a removable shoulder screw head 414 like the removable shoulder screw 402. Rather the removable shoulder screw 802 may have a first screw shaft portion 818 that extends to the driving end of the removable shoulder screw 802. The removable shoulder screw 802 may include driver slot 816. Alternatively, the driving end of the removable shoulder screw 802 may be hexagonal, square, or some other shape that may be used to drive the removable shoulder screw 802. The removable should screw 802 has a second screw shaft portion 822. The removable shoulder screw 802 minimizes access hole size when aesthetics of the product adds value. Another use of the headless removable shoulder screw 802 is when a screw is recessed deep inside a cavity. In this case, the diameter of the cavity does not need to be any greater than the diameter of the screw as opposed to having the diameter of the cavity to be as large as the head diameter for a screw with a head. This may be an advantage to prevent disassembly, increase security, prevent access with pliers for example, and hides the driver type required (i.e., flat, hex, cross, etc.)

The simplicity of the design makes the removable shoulder screw with removable shoulder valuable and useable in a multitude of other designs. The concept of being able to achieve proper strength at the thread portion and proper sized shoulder opens doors to many more applications. This removable screw and removable shoulder may be used in production industries, allowing robotic installation of the screw with access to the head while clamping force is moved away in a difficult to reach area and preventing compressive load failures.

Design for Manufacturing and Assembly (DFMA) shows that there is value when an assembly can be done from a single side only. Bottom-to-top style assemblies result in less moving of the system, less setup time, fewer fixtures, expediting the assembly process, and reducing assembly cost. The use of the removable screw and removable shoulder has many opportunities in many industries such as automotive, medical, consumer products, and telecom. So, while the example of a cooling fan is used herein, the removable shoulder screw may be applied in many other situations and assemblies.

Figure 9:
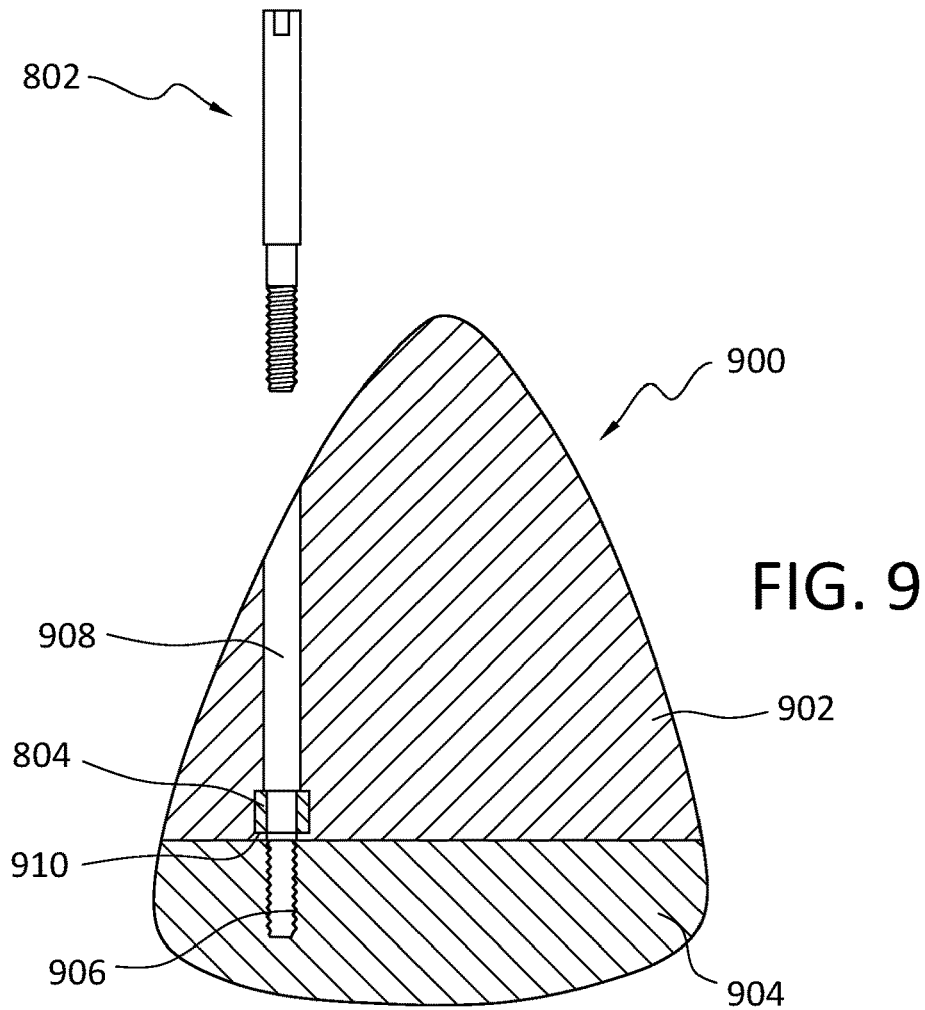
FIG. 9 illustrates the application of the headless removable shoulder screw to a mechanical assembly.

FIG. 9 illustrates the application of the headless removable shoulder screw 802 to a mechanical assembly. The mechanical assembly 900 may include a first assembly 902 and a second assembly 904 that are to be assembled to one another. The first assembly 902 and second assembly 904 may be plastic parts of a consumer product for example. The first assembly 902 includes a screw cavity 908 that extends through the first assembly 902 to a removable shoulder cavity 910. The screw cavity 908 is shaped to accept the removable shoulder screw 802. The removable shoulder cavity 910 is shaped to capture and hold the removable shoulder 804. The second assembly 904 includes threaded hole 906 that engages the thread 824 of the removable shoulder screw 802. The removable shoulder screw 802 is inserted in the screw cavity 908 through the removable shoulder 804 to then engage the threaded hole 906. In some embodiments, the removable shoulder 804 may be molded into first assembly 902. As the removable shoulder screw 802 is tightened the shaft edge 820 of the removable shoulder screw 802 drives the removable shoulder 804 towards second assembly 904 and thus clamps a portion of the second assembly 904 between the removable shoulder 804 and the second assembly 904 to secure them to one another. Because the headless removable shoulder screw 802 does not have a screw head, the screw cavity 908 can have a smaller diameter. Further, headless removable shoulder screw 802 may be long and provide access near the top surface of the first assembly 902 which would facilitate automated robotic assembly, or the headless removable shoulder screw 802 may be made shorter for other reasons. and a longer tool may be used with the headless removable shoulder screw 802.

Figure 10:
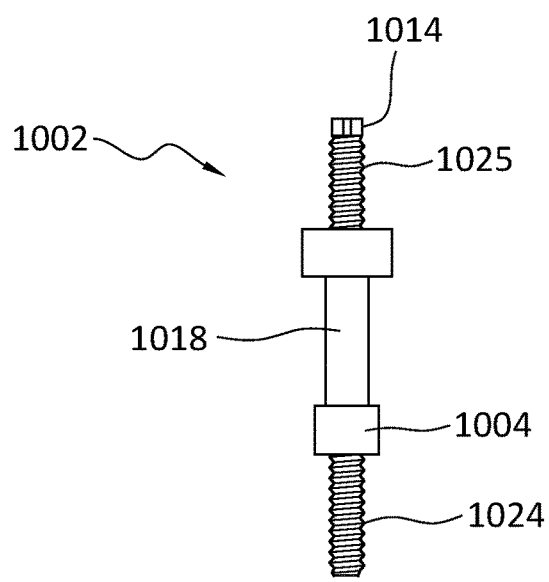
FIG. 10 illustrates another embodiment of the removable shoulder screw and removable shoulder.

FIG. 10 illustrates another embodiment of the removable shoulder screw 1002 and removable shoulder 1004. The removable shoulder screw 1002 has a removable shoulder screw head 1014 that may be used to drive the screw. The removable shoulder screw 1002 has a first screw shaft portion 1018, first thread 1024, and removable shoulder 1004 like the removable shoulder screw 802 but adds second thread 1025. The second thread 1025 may allow for the further assembly of other parts to the removable shoulder screw 1002 using the second thread 1025.

Figure 11:
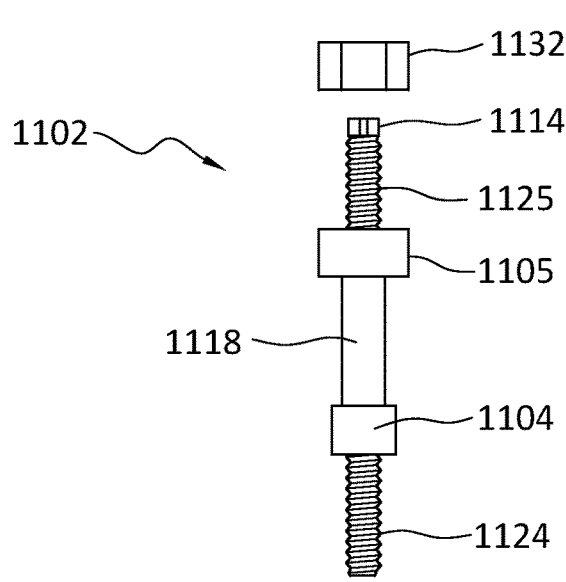
FIG. 11 illustrates another embodiment of the removable shoulder screw and two removable shoulders.

FIG. 11 illustrates another embodiment of the removable shoulder screw 1102 and first removable shoulder 1104. The removable shoulder screw 1102 is similar to the removable shoulder screw 1002 but includes an additional shaft edge adjacent to the second thread 1125 that allows for the use of a second removable shoulder 1105. The removable shoulder screw 1102 has The removable shoulder screw 1002 has a removable shoulder screw head 1114, a first screw shaft portion 1118, first thread 1124, and first removable shoulder 1104, second removable shoulder 1105, and second thread 1125. The second removable shoulder 1105 may allow for multi-level securing of various parts all using a single screw in a single location. The second thread 1125 may also allow for the further assembly of other parts to the removable shoulder screw 1102 using the second thread 1125, for example by using nut 1132.

Various embodiments of removable shoulder screws and removable shoulders have been described that provide various benefits. In one example, the clamping force is at the fan flange and not through the fan housing. Further, the removable shoulder screw diameter is as large as the holes of the fan housing, and its thread is not reduced in size. The removeable shoulder may even be made larger than a regular shoulder screw without impacting the threaded end, or the fan mounting holes. Also, the oversized removeable shoulder offers larger bearing area for the resulting clamping force. The thickness tolerance of the fan housing or housings in the case of dual fans, does not affect how secure the fan is. Furthermore, embodiments disclosed herein allow the fan assembly to be secured to the system through one or more of the fan housing holes. This benefits the system design by minimizing the real estate required to secure the fan assembly. This in turn results in better use of the available space by allowing fan assemblies to be more tightly spaced. This may translate to using more fans or having more cooling capacity in a smaller space. Most fan housings have open style flanges and access to install the removable shoulder is not a problem as shown.

Further, the embodiments disclosed herein allow for a compact design. The fan assembly is secured through the fan holes within the fan envelope so there is no need for spacers or additional space to receive the securing screw. This mounting method allows for side-by-side fan assembly installation, without the need of a dividing space as would be required, for example, in a latching design. The fan assembly envelope is the same as the fan envelope. This allows for closer spacing and even more fans and more flexibility in fan placement.

The foregoing disclosure provides illustration and description but is not intended to be exhaustive or to limit the aspects to the precise form disclosed. Modifications and variations may be made in light of the above disclosure or may be acquired from practice of the aspects.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A fan assembly configured to engage a rack, comprising:
    a fan housing including a first hole in a first flange on a front side of the fan and a second hole in a second flange on a back side of the fan housing;
    a fan mounting assembly configured to engage the fan housing;
    a removable shoulder screw including:
    a first screw shaft portion;
    a second screw shaft portion;
    a threaded portion; and
    a shaft edge between the first screw shaft portion and the second screw shaft portion,
    wherein the second screw shaft portion is between the first screw shaft portion and the threaded portion, and
    wherein a diameter of the second screw shaft portion is smaller than the diameter of the first screw shaft portion; and
    a removable shoulder including a removable shoulder opening and a removable shoulder edge,
    wherein the removable shoulder opening has a diameter less than the diameter of the first screw shaft portion and is configured to engage the second screw shaft portion,
    wherein the removable shoulder edge is configured to engage the shaft edge,
    wherein the removable shoulder screw is configured extend through the first hole and the second hole, and
    wherein the removable shoulder is configured to engage the second flange.

2. The fan assembly of claim 1, further comprising a screw head, wherein a diameter of the screw head is larger than the diameter of the first screw shaft portion.

3. The fan assembly of claim 2, further comprising a spring configured to accept the first screw shaft portion therethrough and to engage the screw head and the fan mounting assembly.

4. The fan assembly of claim 1, further comprising a clip, wherein the clip is configured to engage a clip groove in the first screw shaft portion and engage the first flange.

5. The fan assembly of claim 1, wherein the threaded portion is configured to engage a threaded portion in the rack.

6. The fan assembly of claim 5, wherein the removable shoulder applies a clamping force on the second flange a portion of the fan mounting assembly when the threaded portion engages the threaded portion of the rack.

7. The fan assembly of claim 1, wherein a diameter of the threaded portion is less than or equal to the diameter of the second screw shaft portion.

\* \* \* \* \*